(No Model.)

G. W. PROUTY.
INK ERASER.

No. 469,304. Patented Feb. 23, 1892.

Witnesses:
Walter E. Lombard.
A. D. Simpson

Inventor:
George W. Prouty,
by N. C. Lombard
Attorney.

THE NORRIS PETERS CO., PHOTO-LITHO., WASHINGTON, D. C.

UNITED STATES PATENT OFFICE.

GEORGE W. PROUTY, OF BOSTON, MASSACHUSETTS.

INK-ERASER.

SPECIFICATION forming part of Letters Patent No. 469,304, dated February 23, 1892.

Application filed November 14, 1891. Serial No. 411,850. (No model.)

*To all whom it may concern:*

Be it known that I, GEORGE W. PROUTY, of Boston, in the county of Suffolk and State of Massachusetts, have invented certain new and useful Improvements in Ink-Erasers, of which the following, taken in connection with the accompanying drawings, is a specification.

My invention relates to ink-erasers, and has for its object the production of an eraser especially adapted for use by type-writers; and it consists in certain novel features of construction, arrangement, and combination of parts which will be readily understood by reference to the description of the drawings and to the claims hereinafter given, and in which my invention is clearly pointed out.

Figure 1:
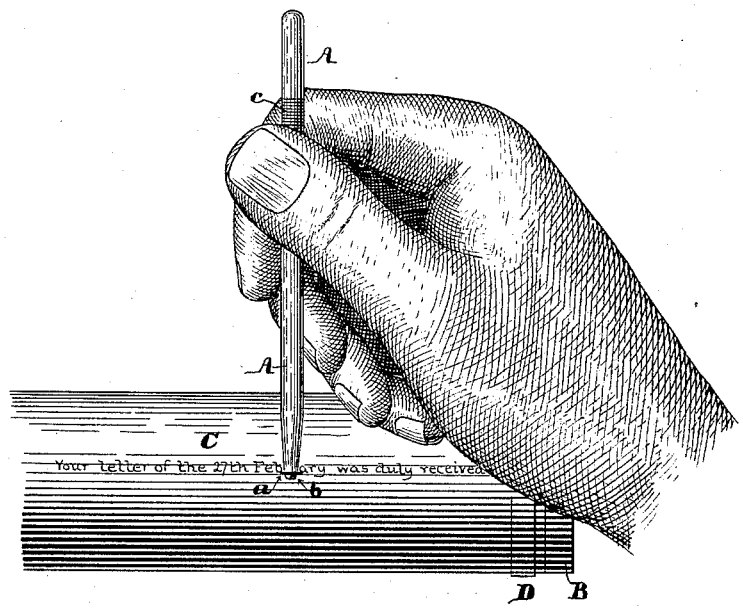
Figure 2:
Figure 3:
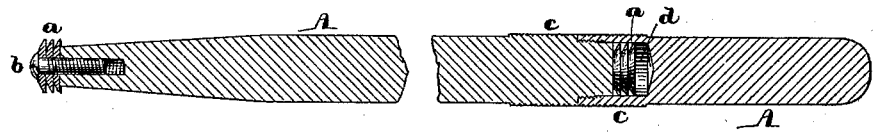
Figure 4:
Figure 5:

Figure 1 of the drawings is an elevation of a portion of a type-writer impression-roll with the hand of the operator holding my improved eraser in the preferred position for practical use. Fig. 2 is an elevation of my improved eraser with one cutter thereon. Fig. 3 is a longitudinal section of the same with a plurality of cutters thereon, drawn to a scale twice as large as that shown in Fig. 2. Fig. 4 is an elevation of a detached cutter, and Fig. 5 is a similar view of a modified form of the cutter.

In the drawings, A is the stock or handle of the eraser, having one or more disk-like cutters $a$ secured to its smaller end by the clamping-screw $b$, set in the end of said stock in axial line therewith, as shown in Fig. 3.

The stock A is made in two parts screwed together, and each part is provided at or near its junction with the other part with a peripheral milled surface $c$ to facilitate the uniting and separating of said two parts. The end of said stock to which the eraser-disk $a$ is secured is made tapering, and the opposite end is preferably made hemispherical, or nearly so, to adapt it to use as a burnisher for rubbing down the surface of the paper after the erasing has been done.

One of the parts of the stock A has formed therein a cylindrical chamber $d$ to serve as a receptacle for spare cutter-disks $a$, as shown in Fig. 3. The cutter-disks $a$ may have continuous circular cutting-edges, as shown in Fig. 4, or the cutting-edge may be broken by a plurality of notches $a'$, as shown in Fig. 5, whereby the cutter is adapted to erase a letter in close proximity to another letter or a line without injury to said other line. The cutter-disks, whether of the one form or the other, are made flat on one side, while the cutting-edge is formed by beveling the other side, as shown in Figs. 3, 4, and 5.

This eraser is especially adapted for use in erasing letters in type-written matter while upon the impression-cylinder, owing to the small part of the cutting-edge which can be brought into contact with the paper at the same time and the fact that the cutting-edge is at right angles to the stock of the eraser, so that the operator while holding the stock between his or her thumb and the fore and middle fingers can present the eraser to the paper with the stock at right angles, or nearly so, to the line of written matter, as shown in Fig. 1, in which B is the impression-cylinder, C the paper wrapped around said cylinder, and D is one of the clip-like springs for holding the paper to the cylinder. When the cutters become dulled by use, so as to be unserviceable, they can be readily sharpened by grinding their flat sides. This can be accomplished in an inexpensive way by simply placing said cutter upon a flat stone with its flat side in contact therewith, placing the finger upon said cutter and moving said cutter back and forth on said stone until it is sufficiently sharp.

I furnish with each stock a plurality of cutter-disks, which may be used singly or collectively, and such cutters as are not secured to the end of the stock by the screw $b$ are placed in the chamber $d$ for safe keeping.

In using my improved eraser when one section of the cutting-edge becomes dulled by slightly rotating the stock about its axis another and sharper section of the edge is brought into position for use, and when the whole edge becomes dulled the disk may be removed and a sharp one substituted therefor, the dulled one being placed in the chamber $d$ until such time as it is convenient to sharpen it. The beveled side of the cutter-disk may be used as a burnisher by holding it in such a position that its edge shall not touch the paper or by moving it only in one direction in contact with the paper.

What I claim as new, and desire to secure by Letters Patent of the United States, is—

1. The combination, in an ink-eraser, of a handle or stock and a circular disk cutter secured to one end thereof and adapted to have any portion of its circular edge brought into position for use.

2. An ink-eraser consisting of a stock or handle and a disk-like cutting-blade having its cutting-edge at right angles to the axis of said stock.

3. An ink-eraser consisting of a handle or stock and a disk-like cutter secured to one end of said stock, with its cutting-edge at right angles to the axis of said stock, said disk having one side flat and the other side beveled at its outer edge to form a cutting-edge.

In testimony whereof I have signed my name to this specification, in the presence of two subscribing witnesses, on this 11th day of November, A. D. 1891.

GEORGE W. PROUTY.

Witnesses:
N. C. LOMBARD,
WALTER E. LOMBARD.